J. C. DE LANEY.
SHAFT COUPLING.
APPLICATION FILED APR. 8, 1912.
1,056,889.
Patented Mar. 25, 1913.
2 SHEETS—SHEET 1.
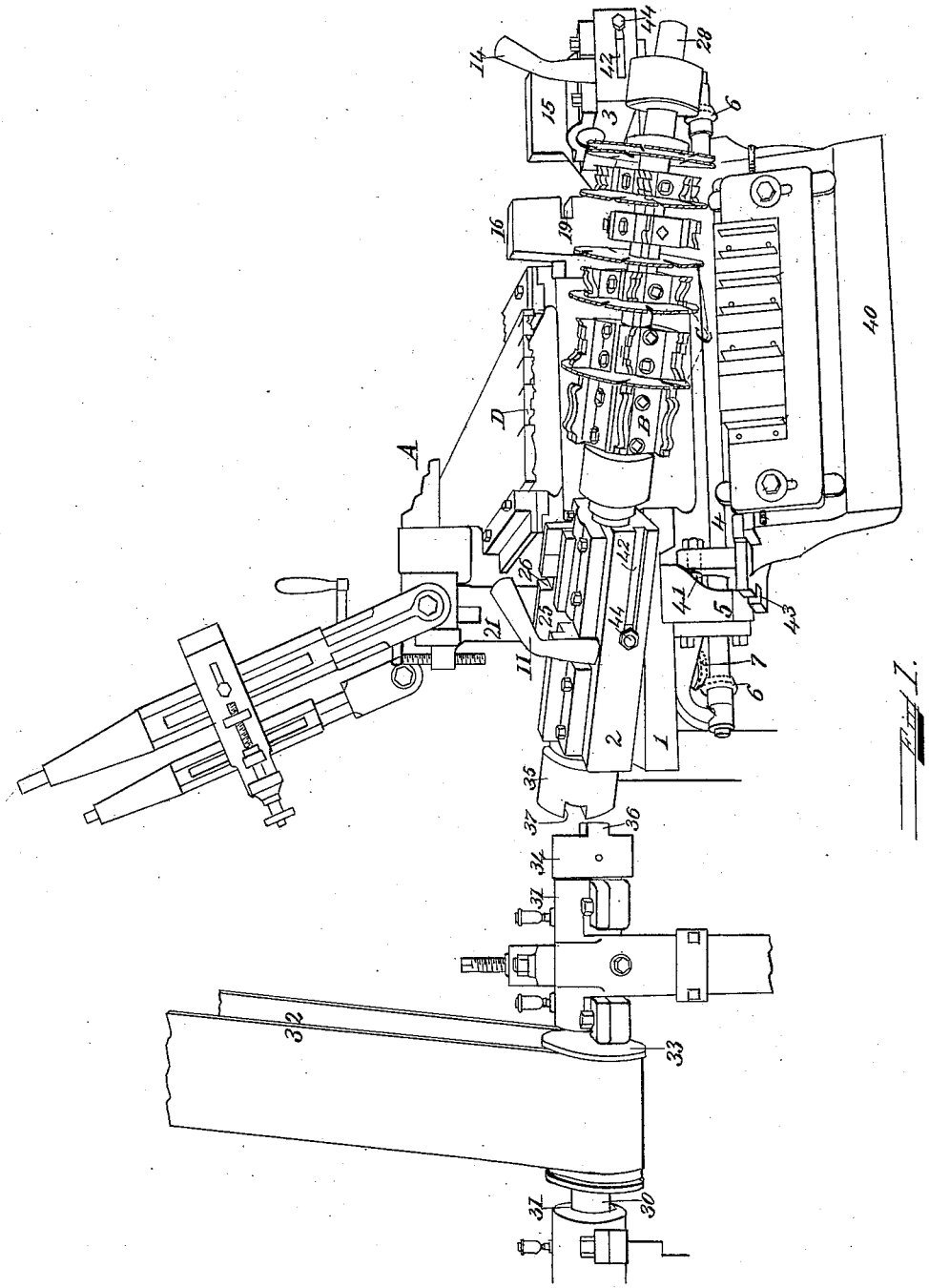

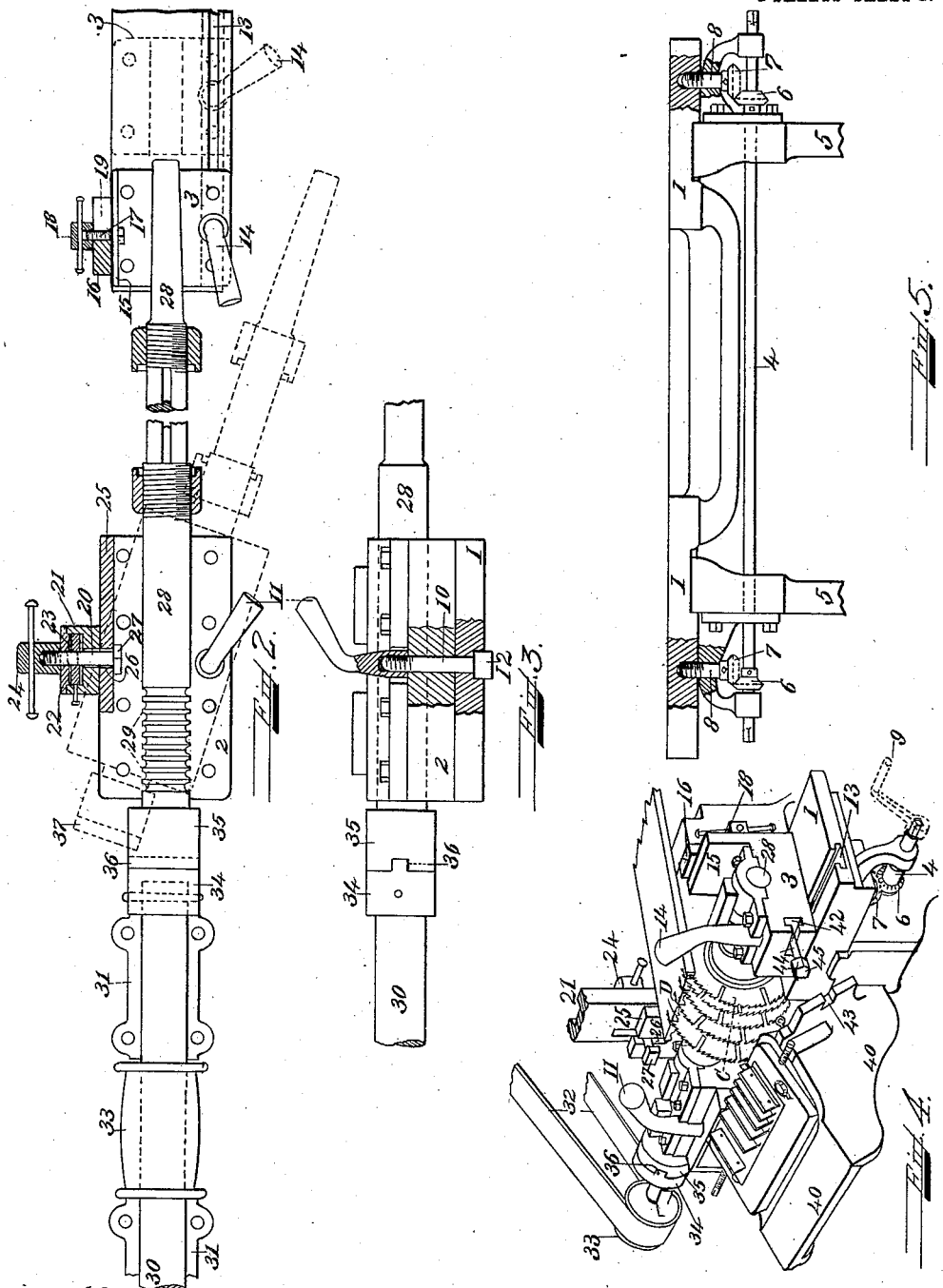

UNITED STATES PATENT OFFICE.

JOHN C. DE LANEY, OF WATERTOWN, MASSACHUSETTS.

SHAFT-COUPLING.

1,056,889.   Specification of Letters Patent.   Patented Mar. 25, 1913.

Application filed April 8, 1912. Serial No. 689,103.

*To all whom it may concern:*

Be it known that I, JOHN C. DE LANEY, a subject of the United Kingdom of Great Britain and Ireland, residing at Watertown, in the county of Middlesex and State of Massachusetts, have invented certain new and useful Improvements in Shaft-Couplings, of which the following is a specification, reference being had therein to the accompanying drawings.

The objects of my invention are:—First, to provide means whereby a balanced shaft or a balanced arbor will remain balanced when power is applied to it; and I attain this object by the use of a driving apparatus so designed as to apply the power to the driven shaft, equally in opposite directions, at diametrically opposite points having the same radius from the axis of the driven shaft. Second, to so design said driving apparatus that the driven shaft or the driven arbor may, without being disturbed in relation to one of its bearing boxes, be simultaneously disconnected from the source of power, and moved into a convenient and suitable position for mounting or demounting pulleys, rings, saws, cutting heads, molding heads, or the like. I attain this object, by mounting the driven shaft or arbor in a bearing box pivoted to a base or frame; and also by having the driving apparatus so designed that when the driven shaft is swung upon its pivot, the driven shaft or arbor swings out of engagement with said driving apparatus, without disturbing the driving shaft. This result will follow where the adjacent ends of the driving and driven shafts have a rib and a slot that can be swung into or out of interlocking engagement when they are in the plane of the swing of the axis of the pivoted driven shaft or arbor.

In the drawings illustrating the principle of my invention and the best mode now known to me of embodying the same in operative structure, Figure 1 is a perspective view showing my invention embodied in a molding machine, only a portion of which is illustrated; and also means (dropped down) employed in working up stock into various forms of molding strips, said means, however, forming no part of my present invention. The pivoted arbor is shown disconnected from its driving shaft, and has been swung into a position for mounting, or demounting the molding heads, saws, etc., some of which are being slid along the arbor. Fig. 2 is a plan, partly in section, showing the pivoted arbor and its driving connections; the tops of the boxes having been removed. Fig. 3 is a detail view, partly in section, showing the driving connections and pivoted journal box of the arbor. Fig. 4 is an end perspective view showing the pivoted arbor and driving connections, in operative position, and a pivoted supporting bracket with adjustable guiding and supporting devices mounted therein, partially dropped down out of normal position, to permit the swinging forward and back of the pivoted arbor. Fig. 5 is a detail view showing the means employed for vertically raising and lowering a portion of the bed of the machine upon which the journal boxes of the pivoted arbor are movably mounted.

Arranged across the finishing end of a molding machine A, Figs. 1 and 4, is a vertically adjustable bed 1, Figs. 1 and 5, upon which are mounted arbor journal boxes 2 and 3. To give the desired vertical movement to this bed, a shaft 4, Fig. 5, is horizontally mounted in the machine frame 5, and has thereon under each box, a bevel gear 6, which meshes with a corresponding bevel gear 7 having a vertical stem 8 turning in and passing up through the frame, and into the base of the bed 1; the holes in the base, and the free end of the stem being suitably threaded. A crank 9, Fig. 4, may be applied to one end portion of this shaft; and, obviously, by turning it, the bed 1 may be raised or lowered while it is in horizontal planes. The journal box 2 rests, and is movable, upon the top of an end portion of the base, about a vertical pivot 10, Fig. 3. This pivot is a threaded bolt extending up through the base into the bottom of the box, where it engages a corresponding thread in the lower portion of a box binder. By turning the binder handle 11 in one direction, the box 2 becomes bound to the bed 1, between the head 12 of the bolt 10 and the portion of the binder handle bearing against the top of the box 2; by turning the handle in the opposite direction, the box becomes sufficiently freed to permit the box to be swung upon the base, around the bolt or pivot as shown in Figs. 1 and 2. The other box 3 is movable transversely of the machine, upon the opposite portion of the base; there being a T-slot 13, Figs. 1, 2 and 4, in the top surface of this portion, engaged by the head of a bolt which passes up through the box 3, and has its threaded end portion engaged to a box binder 14, similar to that, 11, just described in connection with the pivoted arbor box 2. To bind this box 3 to the frame, with the greatest rigidity, the rear portion 15 of this box bears against a back support 16, Fig. 2, on the frame of the machine, and is there secured by a lock bolt 17 and nut 18, Fig. 2, in slidable engagement with a slot 19, Fig. 1, in the back support 16. To give additional rigidity to the pivoted box and the frame of the machine when in operative position, use is made of a slotted bolt 20, Fig. 2, passing through an opening in a channel back 21, and a block 22; and a pivot pin 23 passing through the block 22, and the slot in the bolt; while a head 24 suitably threaded is mounted upon the free end of the bolt which is correspondingly threaded. In the upper portion of the back 25 of the box 2, Figs. 1 and 2, is a vertical slot 26, Figs. 1 and 2, to receive the shank of the bolt; the head 27 of the bolt engaging the outside of the slot. When the parts are in normal position and the head 24 is turned up, they bind the pivoted box 2 and the frame rigidly together; when the head 24 is partially unscrewed from the bolt 20, the latter slides longitudinally upon the pivot pin 23, and permits the head 27 and the bolt to rise out of the slot 26, this being brought about by the weight of the block 22, and the head 24 acting downward around the pivot pin 23; and the pivoted box is free to swing upon its pivot 10, as in Figs. 1 and 2. Mounted in these journal boxes is an arbor 28, Figs. 1 and 2, for the reception of molding heads B and saws C. It has rings 29, Fig. 2, formed thereon to engage corresponding ring cavities in the pivoted journal box 2 to prevent longitudinal movement of the arbor in relation to the boxes. Its free end portion is slightly tapering, and has a corresponding bearing in the opposite box 3 to facilitate the longitudinal movement of the box to free the arbor from the box and permit the arbor to be swung upon its pivot in a manner to be more fully explained hereinafter. That the power to drive the arbor 28 may be so applied as to "twirl" the arbor about its axis, that is, not pull it around as in the case of a belt and pulley upon an arbor, and further that the arbor may be pivoted, there is a driving shaft 30, Figs. 1 and 2, mounted in suitable adjustable bearing boxes 31, and driven by a belt 32 and pulley 33 thereon, together with driving connections secured to the adjacent end portions of the driving shaft 30 and the arbor 28 to be driven. These driving connections consist of two members 34, 35, one having across its end portion a diametrically arranged rib 36; and the other, a corresponding slot 37; there being play or back lash between the coöperating driving and driven points of contact of the rib and slot; the pivot of the arbor box being in such a position that when the slot and the rib are in a plane at right angles to the axis of the pivot, the arbor can be turned upon the pivot without interference between the slot and the rib of the driving connections. It will be noted that by this construction, the power from the driving shaft 30 is transmitted to the arbor 28 equally and oppositely at diametrically opposite points equally distant from the axis of the arbor, and, in so far as the power is concerned, there is no tendency to wear the arbor bearings unevenly, except that due to the weight of the arbor.

In order that the swing of the pivoted arbor 28, Fig. 2, may not be interfered with, by a bracket table 40 with the various parts thereon, Figs. 1 and 4, the table is pivoted to the frame of the machine by pivots 41, Fig. 1, so that the table may be dropped down and out of the path of the swinging arbor. To hold the table up in normal position, a lock slot 42, Fig. 4, is provided in each of the arbor boxes 2, 3, and a corresponding slot 43, Figs. 1 and 4, in each end of the table, whereby a bolt 44 and nut 45, engaging these slots, may be tightened, firmly to secure the table in operative position. This bracket 40, and its several parts constitute no part of my present invention, and are described and claimed in divisional application No. 702,117 filed by me June 6, 1912.

The molding heads and saws shown, and forming no part of my present invention, may be like those shown and described in United States Patent No. 999,014, granted to me July 25, 1911, and they may be secured thereon as described therein.

The stock to be cut up into strips of molding, as D, and the number of styles of strips to be made, having been determined, suitable heads and saws may be selected and mounted upon the arbor. To do this the rib 36 and slot 37, Figs. 1 and 2, in the driving connections 34, 35, must be moved into horizontal position; the box binder 11 and the lock bolt 20 of the pivoted arbor box 2 must be loosened; as must also the box binder 14 and lock bolt and nut 17, 18, of the slidable arbor box 3; the bracket table 40, disconnected from the arbor boxes 2, 3, by disconnecting the lock bolts 44 in the lock slots 42 in the side of the arbor boxes from the slots 43 in bracket table, so that it may be dropped down, out of the path of movement of the swinging arbor. Next, the sliding arbor box 3 is drawn away from the free end of the arbor, as shown in dotted lines in Fig. 2. The arbor may now be moved about its pivoted arbor box, the rib and slot of the connecting members becoming disengaged, see Figs. 1 and 2, and the free end portion of the arbor presented to the operator, in a position to easily receive in the proper order thereon, the molding heads and saws. The arbor is next swung back into alinement with the axis of the driving shaft; the rib and slot of the coupling members move into operative engagement; and the sliding arbor box may be pushed into engagement with the free end portion forming the bearing of the arbor. The boxes, and consequently the arbor, may now be secured absolutely in operative position upon the base of the machine by turning up the box binders 11, 14, and lock nuts 18, 24. The axis of the arbor may be adjusted at the right height in relation to the bed of the machine, by the lifting shaft 4, Fig. 5, and operated by the handle 9, Fig. 4. Next, the bracket table 40 is lifted up about its pivot 41, Fig. 1, and secured in horizontal position by the lock bolts 45 in the lock slots 42, in the boxes, engaging the lock slots 43 in the table, all of which with further matter appears in my said divisional application.

In fine, I have described new and useful means whereby an arbor may be balanced and capable of being swung out of operative engagement with its driving shaft.

Desiring to protect my invention in the broadest manner legally possible, what I claim is:—

1. An arbor; a pivoted bearing box for said arbor; a driving shaft; said arbor, bearing box, and driving shaft, having the same longitudinal axis when they are in operative position; and positive interlocking means to connect the driving shaft and the arbor in operative position, and to permit said driving shaft and arbor to become engaged, or to become disengaged, by swinging the arbor upon its pivot.

2. An arbor; a pivoted bearing box for said arbor; and a driving shaft; said arbor, bearing box, and driving shaft, having the same longitudinal axis when they are in operative position; the adjacent end portions of the driving shaft and arbor, having coöperating driving and driven points of contact, located diametrically opposite, having equal radii, and permitting the driving shaft and arbor to become engaged, or to become disengaged, by swinging the arbor upon its pivot.

3. An arbor; a pivoted bearing box for said arbor; and a driving shaft the adjacent end portions of said arbor and driving shaft being provided with a rib and a slot; whereby the arbor may be swung into or out of position for the rib and slot to engage, for the purpose of operatively connecting or disconnecting the driving shaft and arbor.

4. An arbor; a pivoted bearing box for said arbor; the axis of said pivot being a line not passing through the axis of the arbor but in a plane at right angles to this axis; and a driving shaft; the adjacent end portions of said arbor and driving shaft being provided with a rib and a slot, whereby the arbor, when the rib and slot are substantially in a plane at right angles to the axis of the pivot, may be swung into or out of position for the rib and slot to engage, for the purpose of operatively connecting or disconnecting the driving shaft and arbor.

In testimony whereof I affix my signature in presence of two witnesses.

JOHN C. DE LANEY.

Witnesses:
A. I. CRAWFORD,
E. F. UNIAC.

Copies of this patent may be obtained for five cents each, by addressing the "Commissioner of Patents, Washington, D. C."